INVENTOR.
Harry W. McDonald
BY
ATTORNEYS

Feb. 21, 1967  H. W. McDONALD  3,304,838
FLUID OPERATED MOTOR FOR DRILLING MECHANISM
Filed Feb. 12, 1965  6 Sheets-Sheet 3

INVENTOR.
Harry W. McDonald
BY
Merchant, Merchant & Gould
ATTORNEYS Feb. 21, 1967   H. W. McDONALD   3,304,838
FLUID OPERATED MOTOR FOR DRILLING MECHANISM
Filed Feb. 12, 1965   6 Sheets-Sheet 5

INVENTOR.
Harry W. McDonald
BY
Merchant, Merchant & Gould
ATTORNEYS

United States Patent Office 3,304,838
Patented Feb. 21, 1967

3,304,838
FLUID OPERATED MOTOR FOR
DRILLING MECHANISM
Harry W. McDonald, 1828 E. Windsor, Apt. 13,
Phoenix, Ariz. 85016
Filed Feb. 12, 1965, Ser. No. 432,229
10 Claims. (Cl. 91—142)

My invention relates generally to earth boring devices, and more specifically to rotary bit operating mechanisms, and is in the nature of an improvement on, and/or modification of, the structure disclosed and claimed in my prior U.S. Letters Patent 2,655,344, "Rotary Bit Operating Mechanism," dated October 13, 1953.

The primary object of my invention is the provision of rotary bit operating mechanism of the circumferentially spaced vane type wherein the vanes are urged to their radially outwardly extended operative positions solely by means of the fluid under pressure supplied to the drill bit to remove earthen materials loosened thereby.

A further object of my invention is the provision of a device of the class above described wherein novel means is provided for making maximum utilization of the forces of said fluid pressure in imparting rotation to said drill bit.

A further object of my invention is the provision of a device of the class above described which utilizes a minimum of working parts and is relatively trouble-free in operation under all drilling conditions.

A further object of my invention is the provision of a device wherein a pair of cooperating motors, driven from a common source of fluid pressure, are provided and in which one thereof maintains driving forces if the other thereof, under certain conditions, is rendered inoperative.

A still further object of my invention is the provision of a device in which torque forces may be materially increased by the addition of axially disposed motor sections.

Another object of my invention is the provision of a device wherein such torque forces are more smoothly and evenly applied to a power output shaft.

A further object of my invention is the provision of a device of the class above described which is relatively compact in size and not unduly expensive to manufacture and maintain.

The above and still further objects of my invention will become apparent from the following detailed specification, portions thereof broken away and shown in section;

Referring to the drawings wherein like characters indicate like parts throughout the several views.

Referring with greater detail to the drawings, there is shown a rotary bit operating mechanism indicated generally by the numeral 13. Rotary bit operating mechanism 13 has attached to the upper end thereof a drill pipe 14 connected to a source of fluid under pressure, not shown, and to the lower end a drill bit 15. The mechanism for rotating the drill bit 15 includes a barrel 16 provided at its upper end with a coupling 17 for attaching the barrel 16 to the drill pipe 14. Coupling 17 includes a head portion 18 which has screw threaded engagement with barrel 16 as indicated at 19.

Spaced axially from the head 18 within the barrel 16 and forming a chamber 20, is transmission means indicated generally at 21. Received within the chamber 20 in coaxial alignment with barrel 16 is a cylindrical rotor 22. Rotor 22 includes upper and lower end plates 23, 24, respectively, which are secured to opposite ends of body portion 25 of rotor 22 by means of head-equipped bolts 26. The upper plate 23 is provided with a trunnion 27 which, as shown, is journalled for rotation in head 18. A cam element 28 is rigidly fixed at one side of chamber 20 by means of bolts 28a and includes the cam portion 29, dwell portion 30, which is in juxtaposition with respect to the peripheral surface 31 of rotor 22, and a terminal edge surface portion 32 which is circumferentially spaced from the cam portion 29 and which has a planar surface that is generally radially disposed. Rotor 22 and cam element 28, as shown, are both coexistensive with chamber 20. Formed in the peripheral surface 31 of rotor 22 are a plurality of circumferentially spaced axially extended grooves 33. Pivotally mounted by means of trunnions 34t journalled in recesses formed in end plates 23, 24, for movements from a position in nesting engagement within the grooves 33 to a position radially extended with respect to the rotor 22, are vanes 34. Each of the vanes 34 are also coexistensive with chamber 20.

Figures 1, 2, 3:
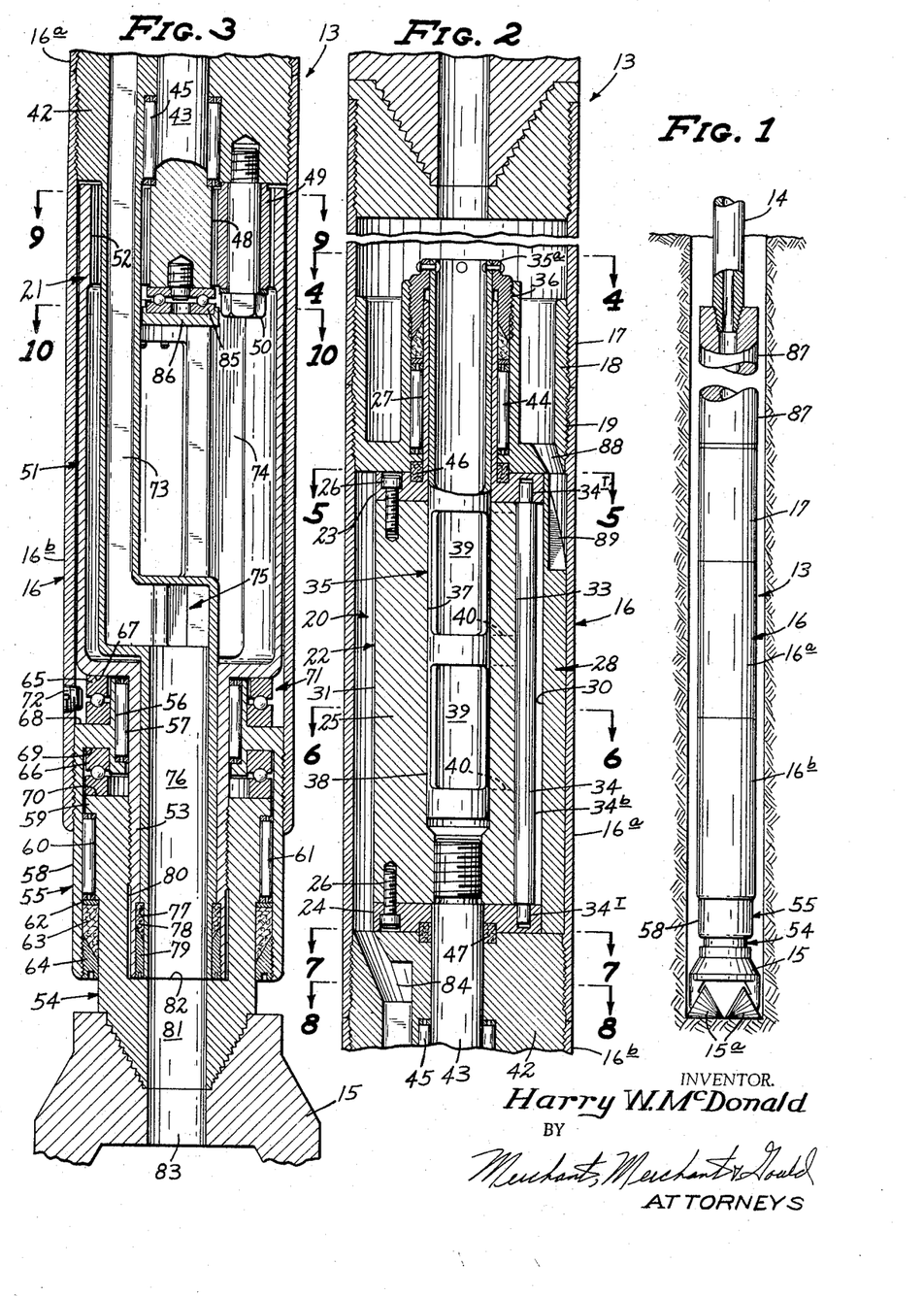
FIG. 1 is a view partly in side elevation and partly in vertical section, showing my device in an operative position, portions thereof broken away and shown in section.
FIG. 2 is a view in axial section of the upper portion of the structure shown in FIG. 1 on an enlarged scale.
FIG. 3 is a view similar to FIG. 2 showing the lower portion of the structure shown in FIG. 1.
Figure 4:
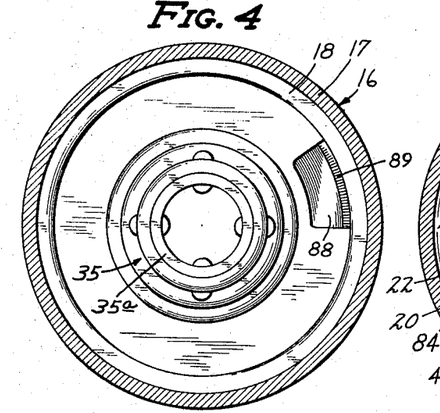
FIG. 4 is an enlarged view in horizontal section as seen from the line 4—4 of FIG. 2.
Figure 5:
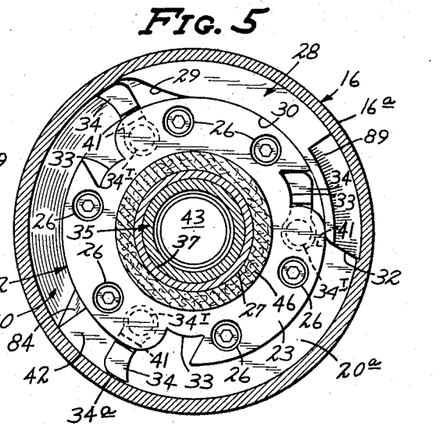
FIG. 5 is an enlarged view in horizontal section as seen from the line 5—5 of FIG. 2.

As shown particularly in FIG. 2, trunnion 27 is tubular in nature and has received therethrough a tubular inlet manifold 35. Manifold 35, at its upper end 35a is provided with a packing gland 36 having screw threaded engagement with head 18. Formed in portion 25 of rotor 22 is an axial bore 37 which is coaxial with the tubular trunnion 27 and receives one end or the lower portion 38 of manifold 35. The upper end 35a of manifold 35 has communication with drill pipe 14 whereby to supply fluid under pressure to rotor 22. Formed in the sidewall of lower end 38 of manifold 35 are the radially opening ports 39. A plurality of radially extended passages 40 are formed in the rotor 22 with one each thereof communicating between one of the grooves 33 and the bore 37. With the above arrangement manifold 35 is rigidly mounted with respect to barrel 16 and passages 40 successively register with ports 39 in the manifold 35 upon rotation of rotor 22 with respect to manifold 35 thereby supplying fluid under pressure to urge the vanes 34 from their nesting position within the grooves 33 to their radially extended position wherein the vanes 34 are in engagement with stop shoulders 41 formed by the grooves 33.

It will be noted that barrel 16 is formed by joining two sections 16a, 16b together with a coupling member 42 which has threaded engagement with adjacent ends thereof. Section 16a houses the rotor 22 and section 16b houses the transmission means 21. Supporting the lower end of rotor 22 is a trunnion-forming shaft 43, the upper end of which is screw-threadedly received in the lower end of rotor 22 and projects downwardly through coupling 42. Head member 18 and coupler 42 are each provided with roller bearings 44, 45 which journal the trunnions 27, 43, respectively, and facilitate rotating of rotor 22 by reducing frictional engagement thereof to a minimum. For the purpose of sealing the bearings 44, 45 from fluid within the chamber 20, trunnions 27, 43 are provided with annular seals 46, 47 which are received in annular channels formed in end plates 23, 24, head 18 and coupler 42. Conventional packing is also provided for packing gland 36 to completely seal the bearing 44 associated with the head 18 from fluid pressure in the drill pipe 14.

Formed on the lower end of the trunnion 43 is a pinion gear 48 which has meshing engagement with a plurality of circumferentially spaced gears 49. Gears 49 are each mounted for rotation on shouldered bolts 50 which have threaded engagement with the coupler 42. Located within the barrel section 16b is tubular member 51 upon the upper end of which is formed a ring gear 52 having internal teeth which mesh with the gears 49. The lower end of member 51 is provided with an axially extended neck portion 53 which, as shown, as threaded engagement with a tubular drive shaft 54, which in turn connects with the drill bit 15.

A sleeve 55 has threaded engagement with the lower end of the barrel section 16b and includes the diametrically reduced portion 56 which forms a bearing surface for roller bearing 57. Bearing 57 journals the upper end of neck 53 and supports same against radial thrust in concentric relationship with barrel section 16b. As shown, the tubular drive shaft 54 is positioned within the diametrically enlarged portion 58 of the sleeve 55 and includes the diametrically enlarged flange 59 in closely spaced axial relationship to the reduced portion 56 of sleeve 55. The reduced lower portion 60 of shaft 54 together with the portion 58 of sleeve 55 defines an annular space which is adapted to receive a roller bearing 61. Roller bearing 61 is maintained in position within the upper end of the annular space, in engagement with flange 59 of shaft 54, by means of an annular ring 62, packing 63, and packing gland 64. With this arrangement, shaft 54 and neck 53 are further supported against axial thrust caused by rotation of drill bit 15 during operation thereof. Positioning the member 51 and shaft 54 with respect to sleeve 55 and supporting same against axial thrust with respect to barrel 16 are upper and lower bearings 65, 66. Bearing 65, as shown, is positioned on the reduced portion 56 and interposed between the bearing surfaces 67, 68, bearing surface 67 being formed at the juncture of neck 53 with the lower end of member 51 and bearing surface 68 being formed at the juncture of diametrically reduced portion 56 with diametrically enlarged portion 58 of sleeve 55. Bearing 66 likewise is journalled on reduced portion 56 and is interposed between bearing surfaces 69, 70, the former of which is formed at the juncture of reduced portion 56 and enlarged portion 58 of sleeve 55 while the latter is formed by the upper surface of flange 59 on the upper end of shaft 54. The above mentioned parts associated with barrel section 16b cooperate to define a fluid tight chamber 71 which is adapted, by means of plug 72, to be filled with a suitable lubricant, not shown, for lubricating the rotating parts of transmission 21.

As shown particularly in FIGS. 2, 3, 7, 9, 10, and 12, coupler 42 has leading therefrom ducts 73, 74, which are spaced radially from the shaft 43 and which pass axially downwardly between the gears 49 to a point of juncture as at 75, where each has communication with a common tubular extension 76. Extension 76 terminates at the extended end of neck 53 and together with same is formed to provide an annular recess 77 for the reception of packing 78 and packing gland 79. Thus chamber 71 is sealed against loss of lubricant therein or entrance of fluid under pressure from without. It will be noted that neck 53 is screw-threadedly received within a counterbore 80 formed in an axial bore 81 in shaft 54, with the lower end of neck 53 and extension 76 in abutting engagement with a shoulder 82 formed by the counterbore 80. Bore 81 in turn communicates with an axial fluid outlet passage 83 formed in drill bit 15. A circumferentially extended outlet 84 is formed in the coupler 42 and has communication with the upper ends of the ducts 73, 74 to permit discharge of fluid from rotor chamber 20. Supporting the rotor 22 against axial thrust is a bearing 85 which, as shown, is mounted on a shelf 86 carried by the ducts 73, 74 in underlying relationship to the trunnion 43 of rotor 22. It will be seen from the above description that all rotating parts of mechanism 13 are mounted for rotation by means of either roller or ball bearings, thus permitted rotation of same with but a minimum of frictional drag caused by either radial or axial forces. It will be noted with respect to FIG. 1 that barrel 16 may be provided with a tubular weighted section or sections 87, suitably coupled to drill pipe 14 and coupler 17, and which tend to increase the cutting action of drill bit 15 during operation of same.

For the purpose of increasing the rotational forces exerted by fluid under pressure from the drill pipe 14 against the vanes of the rotor 22, there is provided a secondary fluid inlet 88 in head 18. Inlet 88 is radially spaced with respect to manifold 35 and extends axially through head 18 in generally overlying relationship to cam element 28. The upper end of inlet 88 communicates with drill pipe 14 while the lower end thereof is in communication with a fluid passage 89 formed in cam element 28 and best shown in FIG. 12. Passage 89 is so formed as to terminate in an outlet in the generally radially disposed surface edge 32. Thus fluid passing therethrough is directed circumferentially of barrel 16 in the direction of rotation of rotor 22 and impinges upon a vane 34 leaving the terminal edge 32 of cam element 28 whereby to exert a maximum amount of force against blade 34.

*Operation*

Figure 6:
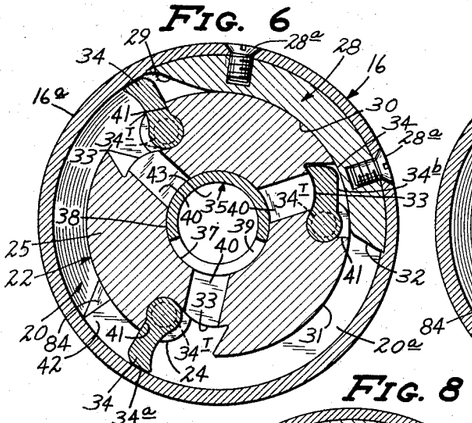
FIG. 6 is an enlarged view in horizontal section as seen from the line 6—6 of FIG. 2.
Figure 7:
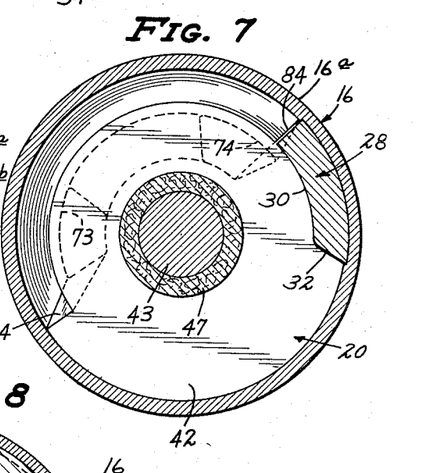
FIG. 7 is an enlarged view in horizontal section as seen from the line 7—7 of FIG. 2.
Figure 8:
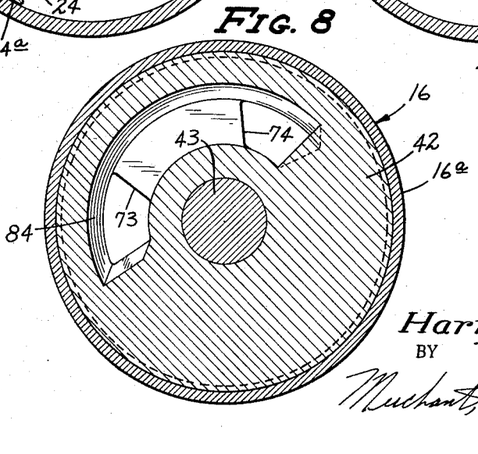
FIG. 8 is an enlarged view in horizontal section as seen from the line 8—8 of FIG. 2.
Figure 9:
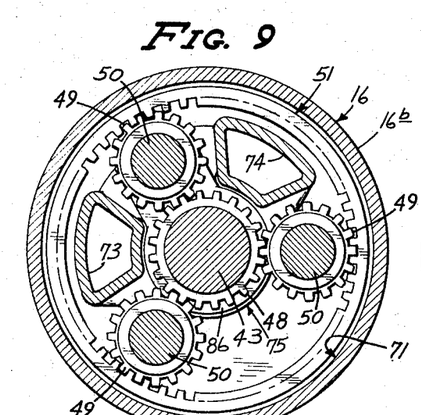
FIG. 9 is an enlarged view in horizontal section as seen from the line 9—9 of FIG. 3.
Figure 10:
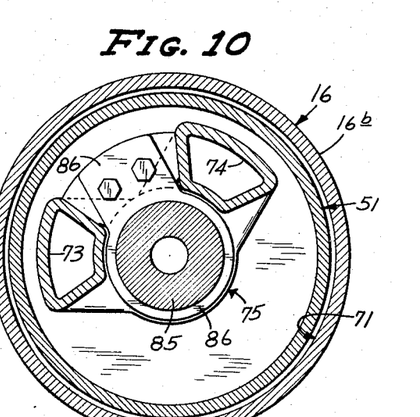
FIG. 10 is an enlarged view in horizontal section as seen from the line 10—10 of FIG. 3.
Figures 11, 12:
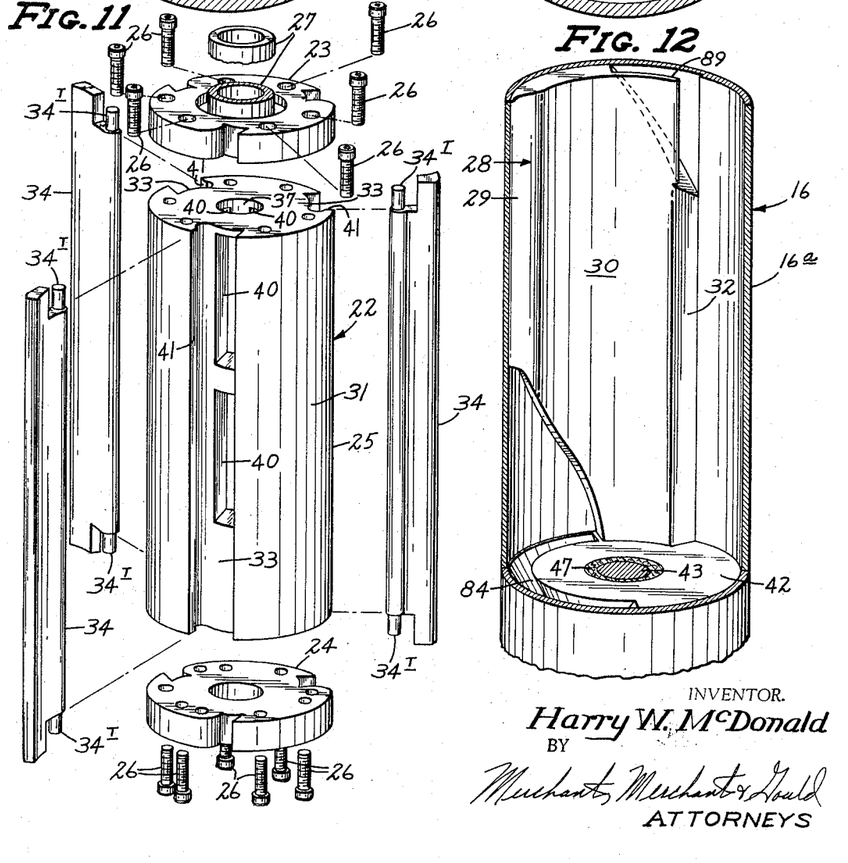
FIG. 11 is an exploded view in perspective of the rotor shown in FIG. 2.
FIG. 12 is a fragmentary view in perspective of the barrel, some parts thereof being broken away and some parts shown in section.

Drilling fluid such as water or the like may be forced through the drill pipe 14 by a pump, not shown, and will enter inlet manifold 35 and secondary passage 88 through the weighted section or sections 87 and tubular coupler 17. Thereafter, the fluid will be forced into pocket 20a and against vane 34a via port 39 and radial passage 40 in register therewith. Such pressure rotates rotor 22 clockwise with respect to FIG. 6. At the same time fluid entering secondary passage 88 is directed through passage 89 whereby to exert an additional force against vane 34a circumferentially of barrel 16 in the direction of rotation of rotor 22. As pocket 20a expands and rotor 22 rotates, pocket 20a comes into communication with outlet 84 and fluid in pocket 20a is discharged. At this time radial passage 40 associated with vane 34b comes into communication with port 39 whereupon pressure is directed against vane 34b urging same radially outwardly into abutting relationship with step shoulder 41. As vane 34b leaves terminal edge 32 of cam element 28, there is formed another pocket, not shown, thus causing further rotation of rotor 22, due to introduction of fluid into such pocket. At the same time vane 34c is cammed into nesting relationship with its respective groove 33 by cam surface 29. Such relationship is permitted due to the fact that no pressure is being directed against the vane 34c inasmuch as the radial passage 40 associated therewith is not in communication with port 39. Thus, as rotor 22 rotates further, vane 34c remains within its groove 33 as same traverses the dwell area 30 of cam element 28 until the radial passage 40 associated therewith comes into register with port 39 as vane 34c leaves terminal edge 32 of cam element 28 and the preceding pocket communicates with outlet 84. Fluid entering passage 84 is directed through ducts 73, 74 to juncture 75 and thence through neck 76, bore 81, and finally through outlet 83, where it is directed to the vicinity of cutters 15a of drill bit 15 to carry away the cuttings produced thereby.

Figure 13:
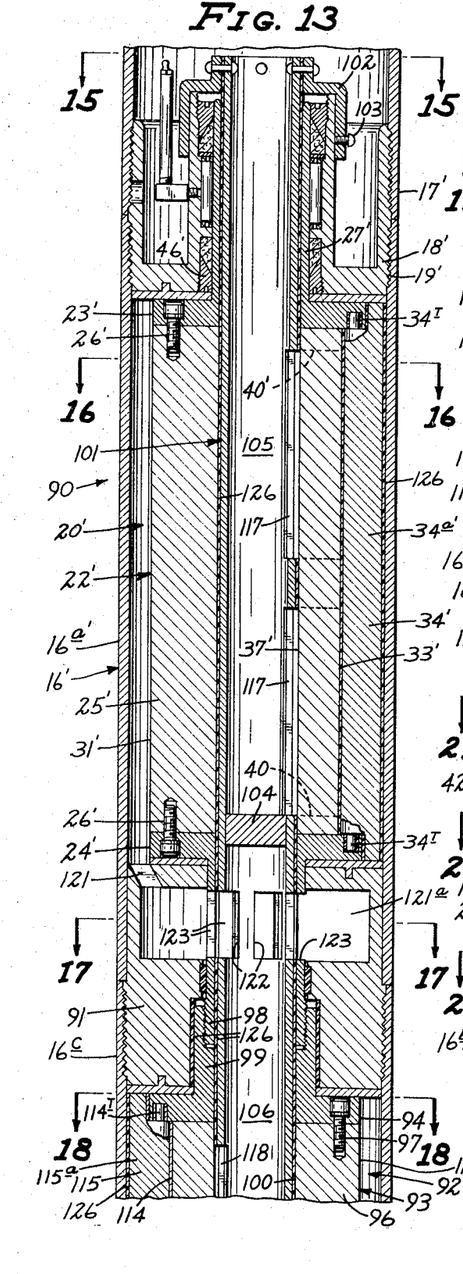
FIGS. 13 and 14 are views in axial section corresponding generally to FIG. 2 showing a modified embodiment of the instant invention.
Figure 14:
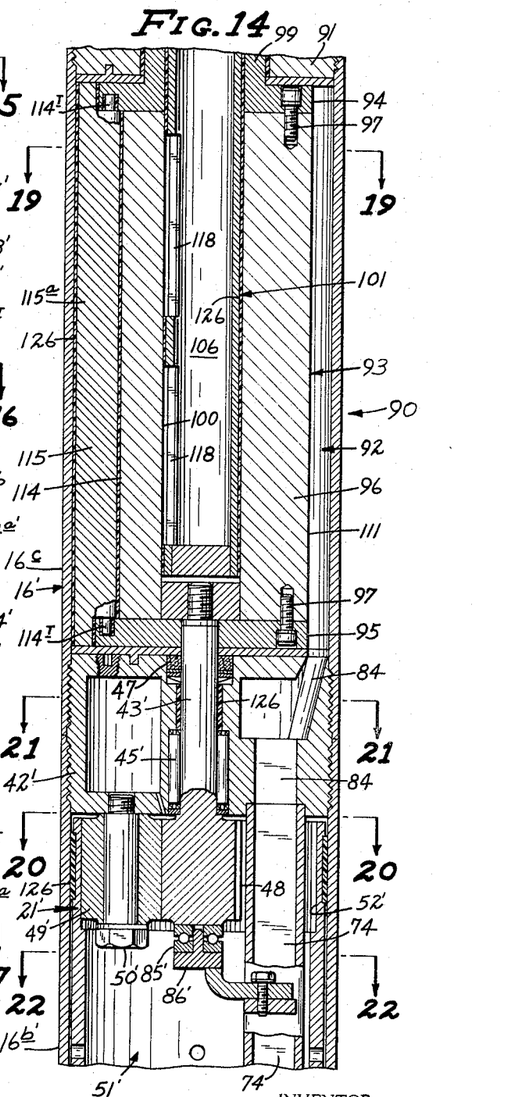
Figure 15:
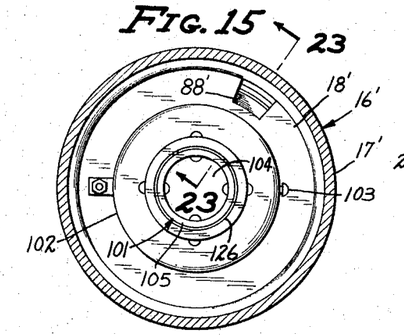
FIG. 15 is a view in horizontal section as seen from the line 15—15 of FIG. 13.
Figure 16:
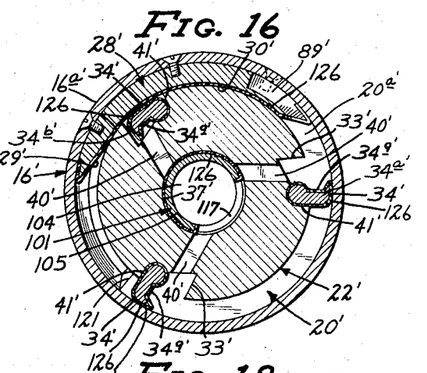
FIG. 16 is a view in horizontal section as seen from the line 16—16 of FIG. 13.
Figures 17, 18:
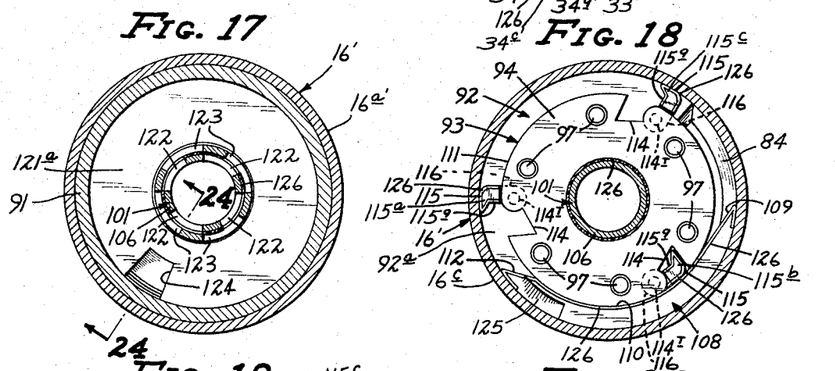
FIG. 17 is a view in horizontal section as seen from the line 17—17 of FIG. 13.
FIG. 18 is a view in horizontal section as seen from the line 18—18 of FIG. 13.
Figure 19:
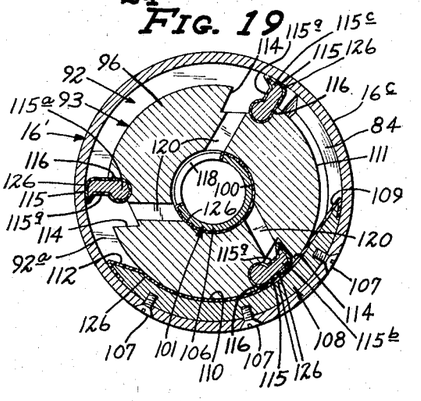
FIG. 19 is a view in horizontal section as seen from the line 19—19 of FIG. 14.
Figure 20:
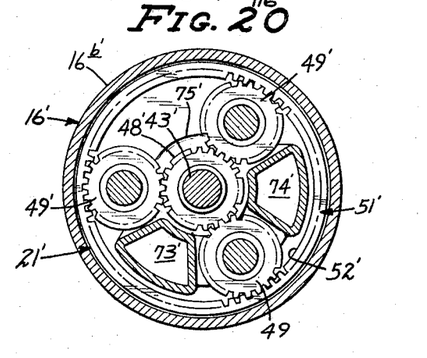
FIG. 20 is a view in horizontal section as seen from the line 20—20 of FIG. 14.
Figures 21, 22:
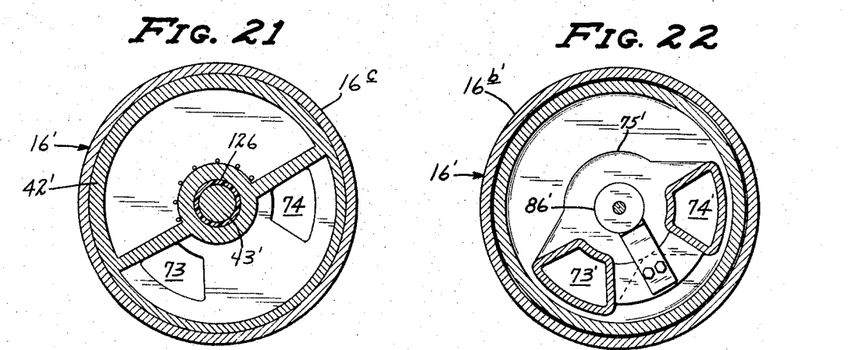
FIG. 21 is a view in horizontal section as seen from the line 21—21 of FIG. 14.
FIG. 22 is a view in horizontal section as seen from the line 22—22 of FIG. 14.
Figure 23:
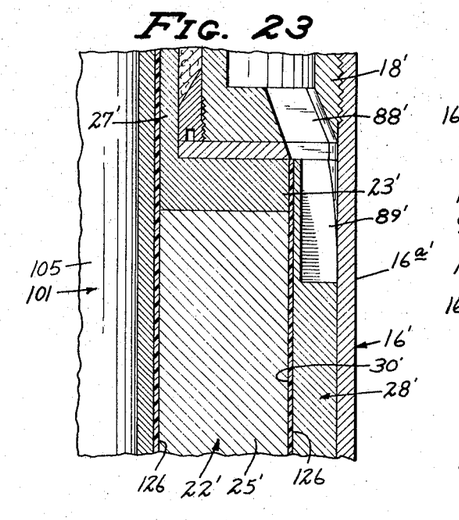
FIG. 23 is an enlarged fragmentary view in vertical section as seen from the line 23—23 of FIG. 15.

Frequently during drilling operations, sand, stone chips or other foreign matter may render the fluid motor inoperative by preventing the vanes associated therewith from assuming their radially outwardly extended operative position. When such events occur it becomes necessary to shut down operations and in one manner or another, such as removing the drill from the hole being drilled, either disassemble and clean or otherwise flush such foreign matter from the motor, once again rendering same operative. With this in mind and in order to maintain operation of the machine during such occurrences, I have provided a modified rotary bit operating mechanism shown in FIGS. 13–24 and indicated generally by the numeral 90. Mechanism 90 is generally similar to mechanism 13, therefore like parts will be indicated by like numerals with prime marks added. With reference to FIGS. 13, 14 it will be noted that a barrel section 16c is interposed between barrel sections 16a' and 16b' with connection made to section 16a' by means of a coupling 91 and to section 16b' by means of coupling 42' associated with transmission 21'. Barrel section 16c together with coupling 91 and coupling 42' cooperate to form a rotor chamber 92 which is axially spaced from chamber 20'.

Received within the chamber 92 in coaxial alignment with barrel 16' is a rotor section 93. Rotor section 93 includes upper and lower end plates 94, 95 respectively which are secured to body portion 96 of rotor section 93 by means of head equipped bolts 97. As shown in FIG. 13 lower plate 24' of rotor section 22' includes a diametrically reduced, tubular trunnion 98 which has threaded engagement with a tubular trunnion 99 formed on the upper end plate 94 of rotor section 93; trunnions 98, 99 each being journaled for rotation in coupling element 91 and serving to join rotor sections 22', 93 together for common rotation. With further reference to FIGS. 13, 14 it will be seen that body portion 96 has formed therein the axial bore 100 which together with tubular trunnions 98, 99 forms an extension of axial bore 37' of rotor section 22'.

An elongated tubular manifold 101 has one end thereof received through the tubular trunnion 27' and is fixed against rotation on head 18' by means of the inverted cup-like member 102, as at 103, and has the other end thereof received within the axial bores 37', 100 and tubular trunnions 98, 99. Positioned within the manifold 101 adjacent the coupling 91 is a plug 104. Plug 104 serves to divide manifold 101 into axially spaced or upper and lower inlet manifold sections 105, 106, the former of which is associated with rotor 22' and the latter of which is associated with rotor 93.

Rigidly fixed at one side of chamber 92 by means of bolts 107 is a cam element 108. Cam element 108 like cam element 28' in upper chamber 20' includes a cam portion 109, dwell portion 110, which is juxtapositioned with respect to the peripheral surface 111 of rotor section 93, and a terminal edge portion 112 which is circumferentially spaced with respect to the cam portion 109. Terminal edge portion 112, as shown, has a planar surface which is generally radially disposed.

Formed in the peripheral surface 111 of rotor 93 are a plurality of circumferentially spaced axially extended grooves 114. Pivotally mounted in each of the grooves 114 on axes parallel to the axis of rotor section 93, by means of trunnions 114t, which are journaled in recesses formed in each end plate 94, 95, are vanes 115. Vanes 115, as shown, pivot from an inoperative position wherein they are in nesting arrangement within their respective grooves 114, to an operative position wherein they are radially outwardly extended and in engagement with a stop shoulder 116 formed by their respective grooves 114. It will be noted, with reference to FIGS. 16, 19 that vanes 34', 115 are each formed on their rearwardly facing portions with the concave surface 34g', 115g which facilitate the catching of fluid as rotor sections 22', 93 rotate.

With respect to FIGS. 13, 14, 16, and 19 it will be seen that manifold sections 105, 106 of manifold 101 include upper and lower radially opening ports 117, 118 respectively which are adapted to supply fluid under pressure to groove 33', 114 of rotor sections 22', 93 through the medium of radial passages 40', 120 which extend between each of the grooves 33', 114 and axial bores 37', 100. In the above described arrangement manifold 101 is rigidly fixed with respect to barrel 16' and passages 40', 120 of rotor sections 22', 93, successively register with ports 117, 118 of manifold 101 upon rotation of rotor sections 22', 93 on manifold 101. Thus, fluid under pressure is supplied to urge the vanes 34', 115 from their nesting, inoperative position within their respective grooves 33', 114 to their radially outwardly extended operative position wherein the vanes 34', 115 are in engagement with their respective stop shoulders 41', 116 formed by the grooves 33', 114.

It will be noted that transmissions 21 and 21' utilized with both mechanisms 13 and 90 respectively are substantially identical with the exception that shaft 43' has screw threaded engagement with the lower end of rotor section 93 instead of rotor section 22.

For the purpose of providing an outlet for chamber section 20' and to supply fluid under pressure to the section 106 of manifold 101 received in bore 100 of rotor section 93, there is provided the outlet passage 121 and annular chamber 121a formed in the coupler 91. Manifold section 106 immediately below plug 104 is formed with the plurality of openings 122 which are adapted to register with a plurality of openings 123 in the tubular trunnion 98 of rotor section 22'. As shown, openings 123 are disposed in annular chamber 121a and therefore all are exposed to the flow of fluid through outlet 121 from chamber section 20'. Openings 122, 123 are of a size to permit constant communication between chamber section 20' and the interior of section 106 of manifold 101 received within bore 100 of rotor 93, thus assuring a constant supply of fluid under pressure from chamber section 20' to rotor section 93 during rotation of rotor sections 22', 93 with respect to manifold 101.

For the purpose of increasing rotational forces exerted by fluid under pressure against the vanes 115 of rotor section 93 there is provided a secondary fluid inlet 124 in coupling 91. Inlet 124 like inlet 88' associated with rotor section 22' is radially spaced with respect to manifold 101 and extends axially from annular chamber 121a through coupling 91 in generally overlying relationship to cam element 108. The lower end of inlet 124 has communication with one end of a fluid passage 125 formed in cam element 108 while the other end of passage 125 terminates in an outlet in the radial surface 112 of cam element 108. Thus fluid passing therethrough is directed circumferentially of barrel 16' in the same manner as in passage 89' associated with cam element 28'.

Figure 24:
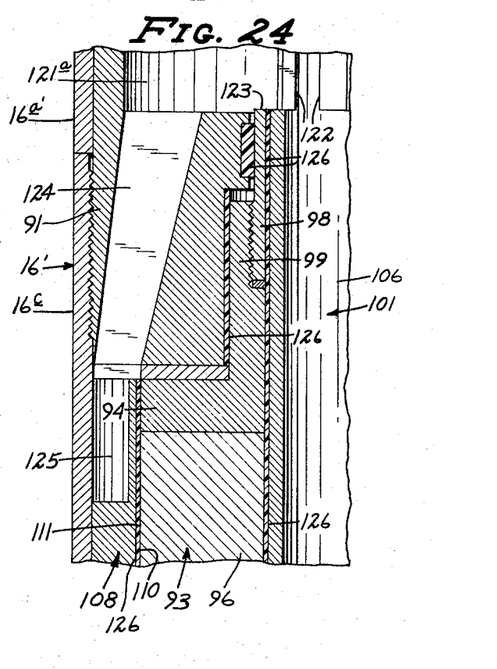
FIG. 24 is an enlarged fragmentary view in vertical section as seen from the line 24—24 of FIG .17.

It will be noted by reference to FIGS. 13, 24 that the vanes 34, 115, cam elements 28', 108, and manifold 101 are coated with a plastic, or like material 126 such as "Teflon." Thus, adequate seal and bearing surfaces are provided to retard leak by and assure friction-free contact of the moving parts with respect to the stationary parts.

*Operation*

In the operation of mechanism 90 fluid under pressure such as water or the like, not shown, enters inlet manifold 101 and secondary passage 88' through the tubular weighted section or sections 87 and tubular coupler 17 from pipe 14. Thereafter, the fluid is forced into pocket 20a' and against the concave surface 34g' of vane 34a' via port 117 radial passage 40' in register therewith, and passage 89' in cam element 28'. Such pressure rotates rotor section 22' clockwise with respect to FIG. 16. As pocket 20a' expands due to the pressure of fluid being forced thereinto rotor section 22' rotates clockwise until pocket 20a' comes into communication with outlet 121 and fluid in pocket 20a' is discharged. At this time radial passage 40' associated with vane 34b' is in communication with port 117 whereupon pressure is directed against vane 34b' urging same to a radially outwardly extended operative position in engagement with its respective stop shoulder 41' thus forming another pocket, not shown, which will cause further rotation of rotor section 22' during introduction of fluid under pressure thereinto.

As the above rotation takes place vane 34c' will come into engagement with cam element 28' and be moved into a nesting arrangement within its respective groove 33', such being permitted due to the fact that no pressure is being directed against vane 34c' as the radial passage 40' associated therewith is not in communication with port 117. Thus, as rotor 22' rotates further, vane 34c' remains within its groove 33' as same traverses the dwell area 30' of cam element 28' until the radial passage 40' associated therewith comes into register with port 117 and the pocket formed by vane 34b' registers with outlet 121 whereupon vane 34c' will move to an operative position in engagement with its respective shoulder 41'. As the above takes place, fluid entering outlet 121 is directed therethrough into openings 122, 123 and from thence into manifold section 106 where the above procedure is repeated. That is, fluid passes from manifold section 106 into a pocket 92a formed by the vane 115a via port 118 and passage 120. At the same time fluid is introduced into pocket 92a by means of the passages 124, 125 from outlet 121 and annular chamber 121a. As pocket 92a expands and rotor section 93 rotates, bringing pocket 92a into communication with outlet 84 to discharge the fluid therefrom, radial passage 120 associated with vane 115b is in register with port 118 and vane 115b is moved to its operative position in engagement with its respective stop shoulder 116 to form another pocket, not shown. Fluid from passages 124, 125 is now directed to such pocket. As the above takes place, vane 115c is moved into nesting arrangement within its respective groove 114, by engagement with cam portion 109, with the radial passage 120 associated therewith being out of register with port 118. Vane 115c remains in its groove 114 as same traverses dwell area 110 of cam 108 or until the passage 120 again comes into register with port 118, and the preceding pocket comes into register with fluid outlet 84'.

Fluid being discharged from outlet 84' of chamber section 92 is then directed to drill 15, in the same manner as mechanism 13, by means of the ducts 73, 74, neck 76, bore 81, and finally outlet 83 where it acts to carry away cutting produce by cutters 15a.

With this arrangement it may be pointed out that torque forces supplied to the power output shaft 43' have been materially increased while at the same time a smoother running, trouble-free motor has been produced.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:
1. In a fluid operated rotary motor adapted to be attached at one end to a source of fluid pressure,
   (a) a barrel,
   (b) a coupler having a head for attaching said barrel to a source of fluid pressure,
   (c) means in said barrel spaced axially from said head and cooperating with said barrel and head to define a chamber,
   (d) a rotor in said chamber,
   (e) a cam element in said chamber at one side thereof which is coextensive with said chamber,
   (f) a plurality of circumferentially spaced axially extended grooves in the peripheral surface of said rotor,
   (g) a vane pivotally mounted in each of said grooves and axially coextensive with said chamber,
   (h) said rotor having an axial bore formed therein,
   (i) a stationary tubular manifold having one end portion secured to and carried by said head, with the other end portion thereof received in said bore, and defining a fluid inlet,
   (j) said manifold having a radially opening port formed in the side wall thereof,
   (k) said rotor having a plurality of radially extended passages formed therein, one each communicating with one of said grooves and said axial bore whereby to urge said vanes radially outwardly under fluid pressure when a given radial passage associated with a respective groove is in register with the radially opening port of said manifold to thereby effect rotation of said rotor with respect to said manifold and said barrel,
   (l) stop means defined by each of said grooves limiting outward swinging movements of its respective vane to its radially outwardly extended operative position,
   (m) a power output shaft extending axially from said rotor and journaled for rotation in said first mentioned means, and
   (n) one of said barrel and said first mentioned means defining a fluid outlet in one end portion of said chamber.

2. In a fluid operated rotory motor adapted to be attached at its upper end to a drill pipe and at its lower end to a drill bit having a fluid outlet therein comprising:
   (a) a barrel,
   (b) a coupler having a head for attaching said barrel to said drill pipe,
   (c) power transmission means in said barrel spaced axially from said head and having a portion cooperating with said head and barrel to define a chamber,
   (d) a rotor in said chamber,
   (e) said chamber having a cam element at one side thereof which is axially coextensive therewith,
   (f) a plurality of circumferentially spaced axially extended grooves formed in the peripheral surface of said rotor,
   (g) a vane pivotally mounted in each of said grooves and axially coextensive with said rotor,
   (h) said rotor having an axial bore formed thereon,
   (i) a stationary manifold having one end portion secured to and carried by said head with the other end portion thereof received in said bore and defining a fluid inlet communicating with said drill pipe,
(j) said manifold having a radially opening port formed in the side wall of said other end portion,
(k) said rotor having a plurality of radially extended passages formed therein one each communicating with one of said grooves and said axial bore whereby to urge said vanes radially outwardly under fluid pressure from said drill pipe when a given radial passage associated with a respective groove is in register with the radially opening port of said manifold to effect rotation of said rotor with respect to said manifold and said barrel,
(l) stop means defined by each of said grooves limiting outward swinging movement of its respective vane to its radially outwardly extended operative position,
(m) said transmission means having operative connection with said drill bit,
(n) means forming a chamber enclosing said transmission means,
(o) a shaft extending from said rotor and having operative connection with said transmission means, and
(p) duct means extending through said enclosing chamber from said rotor chamber in radially spaced relationship to said rotor shaft and communicating with the fluid outlet in said dril bit.

3. A device of the class described in claim 1 in which said head defines a second axially extended fluid inlet radially outwardly spaced from said manifold.

4. A device of the class described in claim 1 in which said cam element includes a cam portion, a dwell portion, and a terminal edge portion, the surface of which is disposed in a plane generally radially of said rotor in circumferentially spaced relationship to said cam portion.

5. A device of the class described in claim 4 in further combination with a fluid passage formed in said cam element communicating at one end with said second fluid inlet and terminating at its other end in the radially disposed surface of said terminal edge portion whereby to direct fluid under pressure generally circumferentially of said barrel in the direction of rotation of said rotor.

6. In a fluid operated rotary motor adapted to be attached to a source of fluid pressure,
(a) a barrel,
(b) a coupler having a head for attaching said barrel to a source of fluid pressure,
(c) means in said barrel spaced axially from said head and cooperating with said head and barrel to define a chamber,
(d) partition means in said chamber defining axially spaced chamber sections,
(e) a rotor in said chamber having the intermediate portion thereof journaled in said partition means with the opposite end portions thereof defining axially spaced rotor sections,
(f) a pair of cam elements each disposed in a different one of said chamber sections at one side thereof and each axially coextensive with its respective chamber section,
(g) a plurality of circumferentially spaced axially extended grooves in the peripheral surface of each of said rotor sections,
(h) a plurality of vanes one each pivotally mounted on an axis parallel to the axes of said rotor sections in each of said grooves and each axially coextensive with its respective chamber section,
(i) said rotor having an axial bore formed therein,
(j) a stationary manifold having one end portion secured to and carried by said head and the other end portion received in said bore,
(k) a plug in said manifold adjacent said partition means and defining axially spaced manifold sections,
(l) said partition means, rotor, and manifold each having cooperating passage means formed therein providing an outlet for one of said chamber sections and permitting constant communication between said one chamber section and the manifold section associated with the rotor section in the other of said chamber sections,
(m) said manifold sections each having a radially opening port formed in the side wall thereof adjacent one of said rotor sections,
(n) said rotor sections each having a plurality of radially extended passages formed therein one each communicating with one of said grooves in its respective rotor section and said axial bore whereby to urge said vanes radially outwardly under fluid pressure when a given one of the radial passages of each of said rotor sections is in register with the radially opening port of its respective manifold section to thereby effect rotation of said rotor with respect to said manifold and said barrel,
(o) stop means defined by each of said rotor sections limiting outward swinging movements of their respective vanes to the radially outwardly extended operative positions thereof, and
(p) a power output shaft fast on the rotor section in the other of said chambers which extends axially therefrom and is journaled for rotation in said first mentioned means,
(q) one of said barrel and said first mentioned means defining a fluid outlet in one end portion of said other chamber.

7. In a fluid operated rotary motor adapted to be attached at its upper end to a drill pipe and at its lower end to a drill bit, having a fluid outlet therein comprising:
(a) a barrel,
(b) a coupler having a head for attaching said barrel to said drill pipe,
(c) transmission means in said barrel spaced axially from said head and cooperating with said head and barrel to define a chamber,
(d) partition means in said chamber dividing said chamber into axially spaced chamber sections,
(e) a rotor in said chamber having the intermediate portion thereof journaled in said partition means with the opposite end portions thereof defining axially spaced rotor sections,
(f) a pair of cam elements one each disposed in a different one of said chamber sections at one side thereof and each axially coextensive with its respective chamber section,
(g) a plurality of circumferentially spaced axially extended grooves in the peripheral surface of each of said rotor sections,
(h) a plurality of vanes one each pivotally mounted in a different one of said grooves and each axially coextensive with its respective chamber section,
(i) said rotor having an axial bore formed therein,
(j) an elongated stationary tubular manifold having one end portion secured to and carried by said head and its other end portion received in said bore,
(k) a plug in said manifold adjacent said partition means and dividing said manifold into a pair of axially spaced manifold sections,
(l) said partition means, rotor, and manifold each having cooperating passage means formed therein providing an outlet for one of said chamber sections and permitting constant communication between said one chamber section and the manifold section associated with the rotor section in the other of said chamber sections,
(m) said manifold sections each having a radially opening port formed in the side wall thereof adjacent one of said rotor sections,
(n) said rotor sections each having a plurality of radially extended passages formed therein one each communicating with one of said grooves in its respective rotor section and said axial bore whereby to urge said vanes radially outwardly under fluid pressure when a given one of the radial passages of each of said rotor sections are in register with the radially opening port of their respective manifold section to effect rotation of said rotor with respect to said manifold and said barrel, (o) stop means defined by each of said rotor sections limiting outward swinging movements of their respective vanes to the radially outwardly extended positions thereof, (p) said transmission means having operative connection with said drill bit, (q) means forming a chamber enclosing said transmission means, (r) a shaft extending from said rotor and having operative connection with said transmission means, and (s) duct means extending through said enclosing chamber from said rotor chamber in radially spaced relationship to said rotor shaft and communicating with the fluid outlet in said drill bit.

8. A device of the class described in claim 6 in which one of said cam elements is circumferentially offset with respect to the other of said cam elements.

9. A device of the class described in claim 6 in which the vanes of one said rotor sections is circumferentially offset with respet to the vanes of the other of said rotor sections.

10. A device of the class described in claim 6 in which the vanes of one of said rotor sections and said cam element associated therewith are circumferentially offset with respect to the vanes of the other rotor section and cam element associated therewith.

No references cited.

MARTIN P. SCHWADRON, *Primary Examiner.*

R. R. BUNEVICH, *Assistant Examiner.*